(12) United States Patent
Arango Cortes et al.

(10) Patent No.: US 12,514,999 B2
(45) Date of Patent: Jan. 6, 2026

(54) FOOT PEDAL UNIT FOR AIRWAY MASK

(71) Applicant: FUNDACION ABOOD SHAIO EN REESTRUCTURACION, Bogota (CO)

(72) Inventors: Maria Lucia Arango Cortes, Bogota (CO); Carlos Javier Latorre Rojas, Bogota (CO); Jose Luis Lozano Villanueva, Bogota (CO); Nicolas Navarro Pulido, Bogota (CO)

(73) Assignee: FUNDACION ABOOD SHAIO EN REESTRUCTURACION (CO)

( * ) Notice: Subject to any disclaimer, the term of this patent is extended or adjusted under 35 U.S.C. 154(b) by 758 days.

(21) Appl. No.: 17/759,645

(22) PCT Filed: Apr. 23, 2021

(86) PCT No.: PCT/IB2021/053354
§ 371 (c)(1),
(2) Date: Jul. 28, 2022

(87) PCT Pub. No.: WO2022/224020
PCT Pub. Date: Oct. 27, 2022

(65) Prior Publication Data
US 2024/0181186 A1    Jun. 6, 2024

(51) Int. Cl.
*A61M 16/06*    (2006.01)
*A61M 16/00*    (2006.01)
(Continued)

(52) U.S. Cl.
CPC .... *A61M 16/0075* (2013.01); *A61M 16/0616* (2014.02); *A61M 16/0816* (2013.01);
(Continued)

(58) Field of Classification Search
CPC ........ A61B 2505/01; A61B 2560/0443; A61B 5/082; A61B 5/0836; A61B 5/097;
(Continued)

(56) References Cited

U.S. PATENT DOCUMENTS

| | | | | |
|---|---|---|---|---|
| 1,177,208 A | * | 3/1916 | Pierpont | A61M 16/0048 128/202.28 |
| 4,821,713 A | * | 4/1989 | Bauman | A61M 16/0084 128/205.24 |

(Continued)

FOREIGN PATENT DOCUMENTS

EP    3020439 A1    5/2016

*Primary Examiner* — Annette Dixon
(74) *Attorney, Agent, or Firm* — Patenting Consulting Group; Roberto J Rios

(57) ABSTRACT

The invention belongs to the field of medical sciences and respiratory masks. It is a cardiopulmonary resuscitation device that delivers assisted ventilation via a foot- or compressor-controlled bellows mechanism. This device frees the use of the hand used to compress the conventional self-inflating Airway Mask Bag Unit (AMBU), so that the free hand can be used to fit the mask over the patient's face and reduce the mechanical fatigue generated by the manual compression of current mechanisms. The unit attaches to ventilation masks, can have a frequency meter and is compatible with accessories comprising conventional cardiopulmonary resuscitation devices; inside it has a valve that controls the filling of the oxygen reservoir and the time at which oxygen is released to be supplied to the patient.

20 Claims, 4 Drawing Sheets

(51) Int. Cl.
*A61M 16/08* (2006.01)
*A61M 16/20* (2006.01)
*F16K 11/00* (2006.01)

(52) U.S. Cl.
CPC ............ *A61M 16/201* (2014.02); *F16K 11/00* (2013.01); *A61M 2016/0027* (2013.01); *A61M 2205/078* (2013.01)

(58) Field of Classification Search
CPC ...... A61B 5/4836; A61B 5/7445; A61M 1/82; A61M 16/0003; A61M 16/0009; A61M 16/0048; A61M 16/0051; A61M 16/0075; A61M 16/0078; A61M 16/0084; A61M 16/01; A61M 16/021; A61M 16/022; A61M 16/04; A61M 16/06; A61M 16/0816; A61M 16/085; A61M 16/0866; A61M 16/0875; A61M 16/1005; A61M 16/12; A61M 16/20; A61M 16/208; A61M 16/209; A61M 2016/0027; A61M 2016/003; A61M 2016/103; A61M 2205/078; A61M 2205/35; A61M 2205/505; A61M 2230/432; F04B 45/02
See application file for complete search history.

(56) References Cited

U.S. PATENT DOCUMENTS

| | | | |
|---|---|---|---|
| 4,898,167 A * | 2/1990 | Pierce | A61M 16/0075 128/205.12 |
| 2008/0087285 A1 | 4/2008 | Kuo | |
| 2015/0238722 A1 * | 8/2015 | Al-Ali | A61M 16/085 128/205.13 |
| 2016/0067435 A1 | 3/2016 | Thomas | |
| 2018/0369524 A1 * | 12/2018 | Bansal | A61M 16/0009 |

* cited by examiner

FOOT PEDAL UNIT FOR AIRWAY MASK

TECHNOLOGY SECTOR

The present invention belongs to the field of medical or veterinary sciences; hygiene, respiratory or anesthesia masks, and more particularly to a device for cardiopulmonary resuscitation and has the purpose of providing assisted ventilation to the patient by means of a bellows mechanism controlled by the foot. This mechanism frees the use of the hand that is regularly used to compress the conventional self-inflating bag or also called AMBU (Airway Mask Bag Unit), in order to be used in the correct adjustment of the mask on the patient's face and ensure a proper seal, as well as reducing the mechanical fatigue generated by the manual compression that is performed with the current mechanisms. The unit is coupled to conventional ventilation masks and has a valve inside that controls the filling of the oxygen reservoir and the moment in which the oxygen is released to be supplied to the patient.

STATE OF THE ART

Conventional ventilation is routinely performed in cases of cardiopulmonary pulmonary resuscitation and in most cases is done with a self-inflating bag system or also called AMBU (Airway Mask Bag Unit), which is connected to a face mask that allows the passage of air from the bag to the respiratory tract, However, it is important to describe that in order to achieve effective ventilations, it is necessary to make a good seal between the face mask and the patient's face, a seal that is achieved by positioning both hands around the mask leaving room for the traction of the jaw. Likewise, to achieve air entry into the mask, adequate insufflation of the balloon should be performed, pressing the balloon for each ventilation required. Current devices are not designed to optimally guarantee the performance of both functions simultaneously, since to ensure an adequate seal of the face mask it is necessary to perform a bimanual maneuver on the patient's face and the balloon, in order to guarantee the stability of the mask and avoid air loss. When balloon insufflation is required, the operator must necessarily remove one of his hands from the face mask in order to depress the balloon containing the mechanism and send the air into the respiratory tract, so that the proper seal between the face mask and the nasal and oral cavities of the patient is lost, originating in most cases, air leakage and loss of the effectiveness of the ventilations.

These failures are even more prevalent in cases where the health professional in charge of performing ventilations does not have adequate training, if simultaneous maneuvers are being carried out on the individual's airway or even if the patient has factors associated with difficult ventilation. Likewise, the physical effort involved in the proper positioning of the mask and the simultaneous performance of balloon insufflation for a prolonged period of time, as in cases of cardiopulmonary resuscitation, causes the operator to make a greater mechanical effort as the minutes go by, which increases the physical wear and tear and can generate even more errors in the process.

In terms of relevant background, there is patent application No. EP3020439A1 "Ventilation Device and method for operating a ventilation device", published on May 18, 2016 and whose holder is Vera Seifert, which shows a respiratory device comprising a respiratory bag having at least one oxygen-containing gas inlet valve, an oxygen-containing gas outlet valve, a respiratory element and a mechanism actuation device comprising a foot pedal. The pedal can be configured as a lever, button, switch, rocker, press, pliers or any combination of these. It is also possible to design the foot control device and the resuscitation bag as a bellows. When operating all of the above-mentioned embodiments, a rectilinear or arcuate (lifting) motion is performed with the foot. The present invention refers to a respiratory device and method oriented to facilitate the handling of manual resuscitators and AMBU respiratory bags, mainly seeks freeing at least one hand when providing therapy by means of an actuator element designed as a pedal of multiple configurations that depresses the respiratory bag, which has oxygen inlet and outlet valves. One of the main differences lies in the fact that the prior art does not describe the O2 reservoir bag but mentions that O2 is supplied directly by means of O2 inlet and outlet valves.

The claims of the invention EP3020439A1 comprise a complete system of device for manual resuscitation. On the other hand, the present invention describes a unique accessory that replaces the ambu-bag, comprising a pedal-operated flexible bellows mechanism that initially supplies air but which, thanks to being compatible with the masks and different valves existing on the market, it is possible to connect it with the pressure valves and thus with the O2 reservoir bags. In addition, it has a valve system that includes a gate to ensure the correct filling of the O2 reservoir bag.

There is also the Patent Application No. US20080087285A "Adjustable Multifunctional Carrying Strap for an AMBU-bag," published on Apr. 17, 2008, which shows an adjustable multifunctional carrying strap for an AMBU-bag attached to the ambu-bag and can be adjusted to be tighter or looser. The carrying strap allows a single palm to be attached to the ambu-bag, so that the ambu-bag can be operated with one hand, and a mask can be operated with the other hand to press on the jaw part of a patient, so as to effectively achieve a rescue purpose. In addition, the carrying strap may also allow the ambu-bag to be carried with one hand or hung on a wall as a backrest. In this background, the strap allows the ambu-bag to be held more firmly, however, the mechanical wear generated by the hand movement for compression of the bag remains, likewise, holding the patient's mask with one hand alone does not guarantee a proper seal of the mask. The new invention is part of devices for cardiopulmonary resuscitation and is intended to provide assisted ventilation to the patient by means of a bellows mechanism controlled by the foot; it provides a new mechanism for filling the air pedal in the unit by means of a damper which in turn controls the oxygen inlet into the mask from the reservoir bag and from the external supply.

The invention is intended to function as an accessory that replaces the manual resuscitation bag, but is compatible with other existing accessories such as mask, pressure valves, connection to oxygen supply, among others, and is also suitable for use with external oxygen supply or only with ambient air supply.

Additionally, patent application US20160067435A1, "Endopharyngeal Airway Device and Kit and Method of Use," published on Mar. 10, 2016, shows A kit for ventilating a patient incapable of normal ventilation with current anesthetic techniques due to a risk for airway obstruction in surgical procedures requiring conscious sedation monitored anesthesia care (MAC). Includes a single-lumen endopharyngeal nasal tube with an eye shaped opening at its distal end and a cylindrical proximal end used as an adaptor for anesthetic applications such as positive airway pressure via modified ambu-bag or other various anesthesiology applications. Contiguous to the distal end of the nasal tube is an end-tidal CO2 monitoring port (ETCO2). On the distal end of the flexible nasal ventilation tube is an eye-opening allowing air flow to the posterior pharynx. The kit further includes a modified ambu-bag which allows for controlled airflow to the patient during a procedure.

This background discusses a modification of the anesthesia delivery system for patients requiring partial consciousness during surgical procedures, especially designed for patients with airway obstruction. The device is intended to improve the flow and direction of air over the patient, does not have automatic insufflation control systems and is used with positive pressure equipment. Additionally, the background requires a type of intubation which is not necessary in cardiopulmonary resuscitation and is focused on improving the anesthesia procedure with partial state of consciousness. Its design does not specify how to ensure the seal over the patient's face, nor does it reduce muscle fatigue due to compression of the insufflation bag, which are solutions proposed by the new invention.

DESCRIPTION OF THE INVENTION

The attached figures illustrate the proposed scope of the invention within the proposed foot pedal insufflation unit for airway mask.

Figure 1:
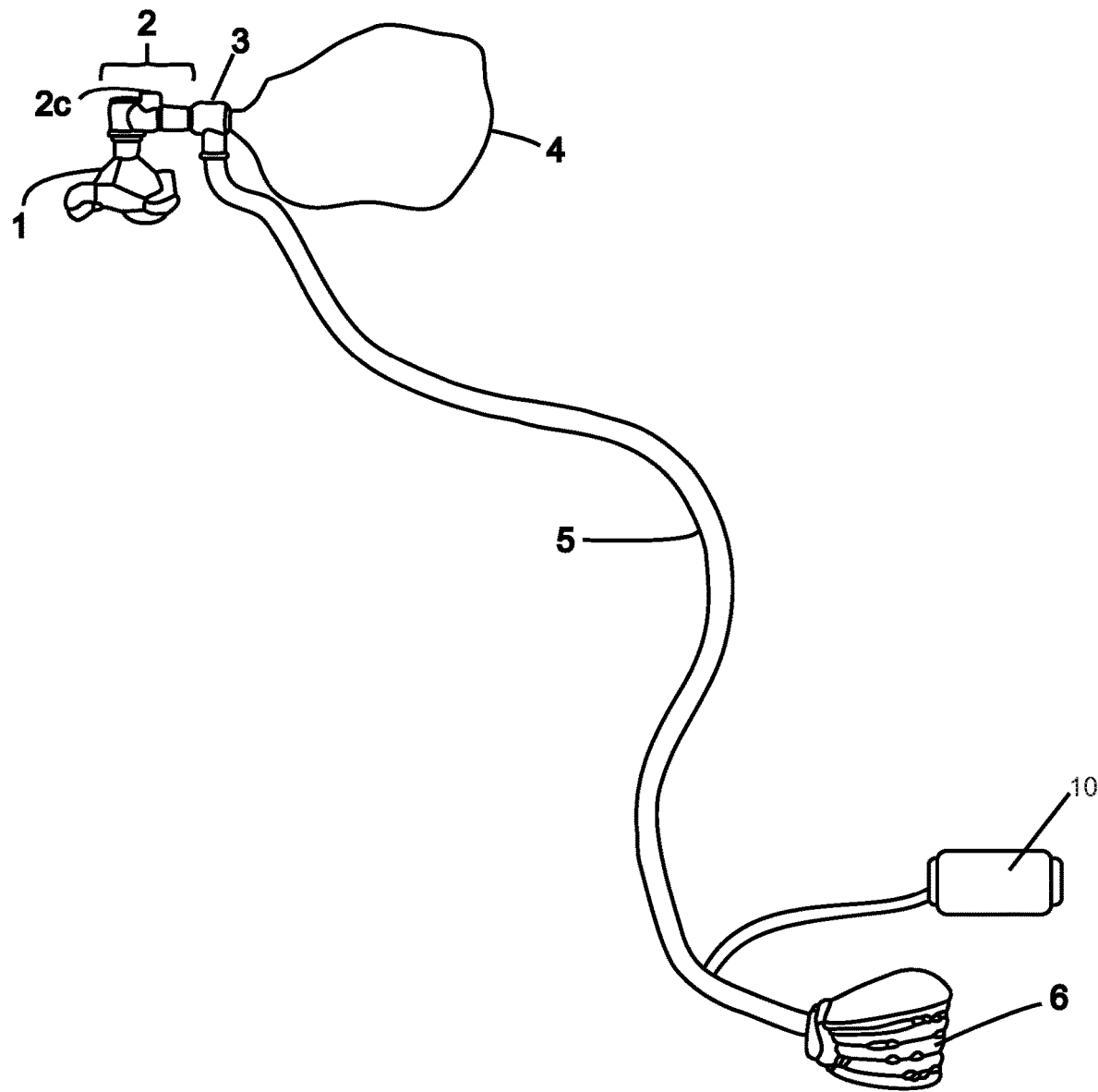
FIG. 1 shows a side view of the foot pedal insufflation unit for airway mask.
Figure 2:
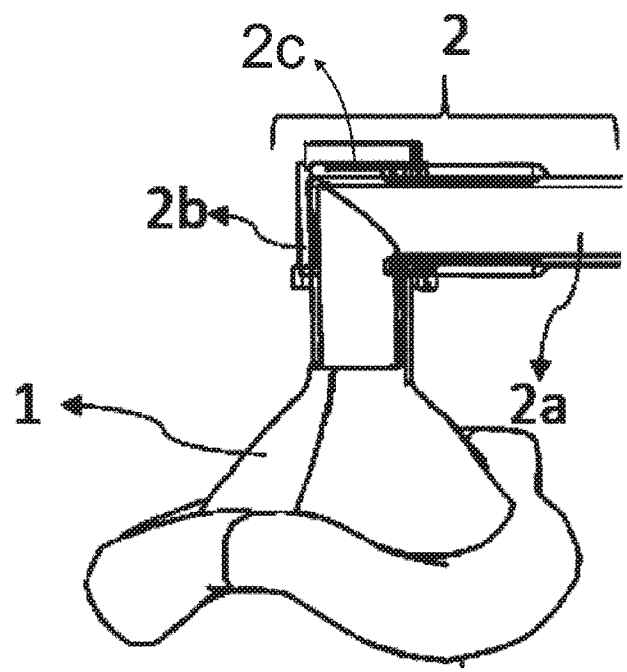
FIG. 2 shows an enlarged side view of the mask and its connection to the valve mechanism.
Figure 3:
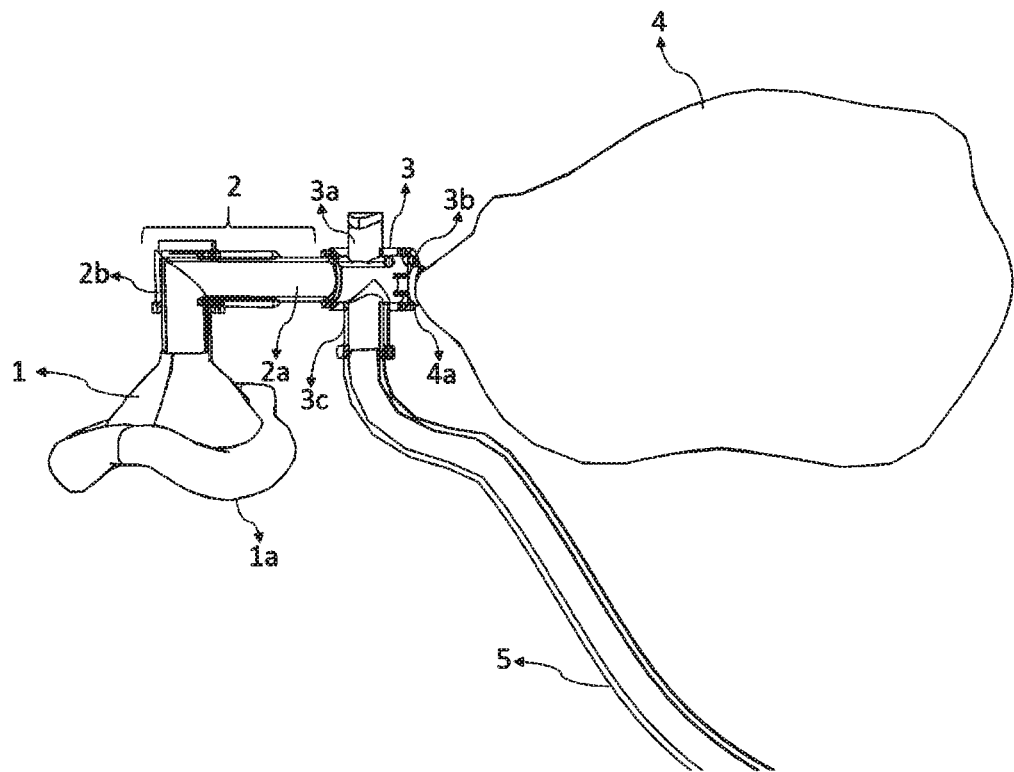
FIG. 3 shows a magnified side view of the mask and its relationship to the reservoir and the open connection of the foot-operated insufflator.

The present invention is a foot-operated insufflation unit for an airway mask which is part of cardiopulmonary resuscitation devices and has the purpose of providing assisted ventilation to the patient by means of a foot-controlled bellows mechanism. This mechanism frees the use of the hand that is regularly used to compress the conventional ambu-bag, in order to be used in the correct adjustment of the mask on the patient's face and ensure a proper seal, also reduces mechanical fatigue generated by the manual compression that is performed with the current mechanisms.

The unit is coupled to conventional ventilation masks and has five main parts inside: a valve that controls the filling of the oxygen reservoir and the moment in which oxygen is released to be supplied to the patient, an airtight mask, a reservoir, a pedal and a pedal connector tube.

The device comprises a mask (1) with perimetral hermetic seal (1a) that is placed over the patient's face that when pressed generates a hermetic seal between the face and the mask (1). A coupling (2) connects the mask (1) to the valve mechanism (3) through the connector (2a) which also has a pressure measuring device (2c) to indicate the pressure at which the air is being insufflated and a perpendicular connector (2b) that adjusts the pressure measuring device (2c) to the connector (2a).

The valve mechanism (3) is connected to the pedal tube (5) through the perpendicular section (3c), where the perpendicular section (3c) has a hollow damper (3a) that controls the passage of air from the pedal tube (5) and a reservoir (4) when the pressure is sufficient to raise the hollow damper (3a).

The valve mechanism (3) is connected to the reservoir (4) with a reservoir coupling (4a), in the reservoir oxygen is stored which flows from external administration and is connected to the reservoir damper (3b) which conducts oxygen to the reservoir (4) and the valve mechanism (3). A bellows pedal (6) is connected to the pedal tube (5), which when depressed, generates a stream of air flowing through the pedal tube (5) to the perpendicular section (3c) over which is located the hollow damper (3a) which is raised allowing the mixing of the air generated by the bellows pedal (6) with oxygen from the reservoir (4) and with oxygen from the external source entering through the reservoir damper (3b); where this air mixture is directed to the mask (1) through the coupling (2) and in this way is supplied to the patient through the mask (1) held tightly on his face.

Thus, by facilitating the use of both hands in the maneuver of securing the mask (1) on the patient's face, a better oxygen transmission is guaranteed and therefore the cardiopulmonary resuscitation process. On the contrary, when the bellows pedal (6) is not depressed, the hollow damper (3a) remains static, which facilitates the filling of the reservoir (4) with oxygen from an external source that enters through the reservoir damper (3b).

Figure 4:
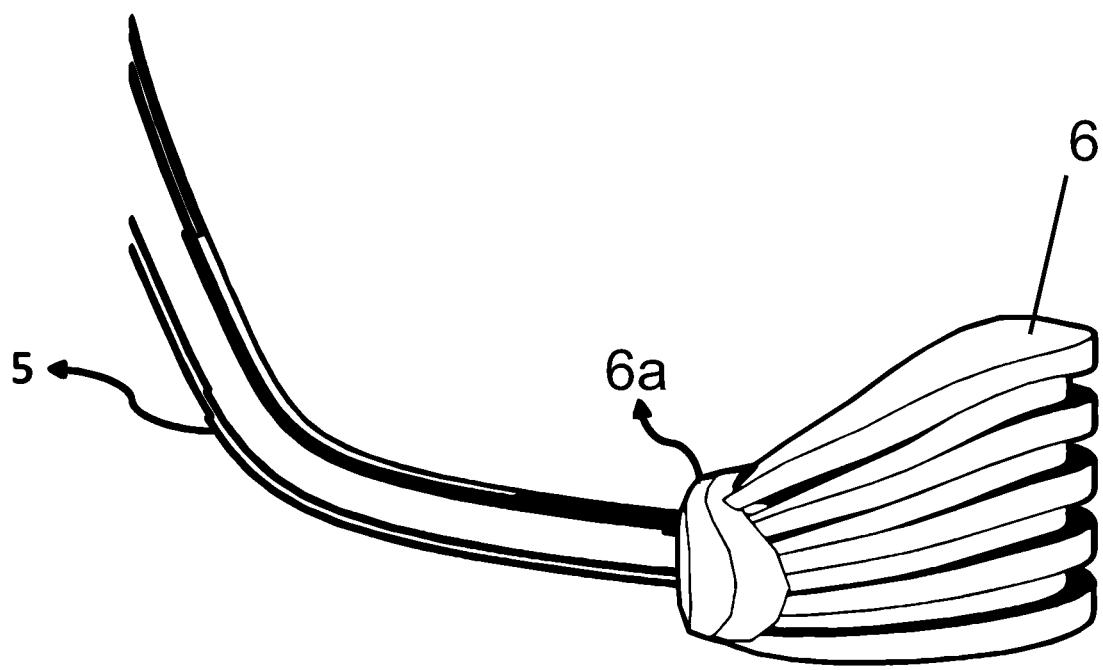
FIG. 4 shows a side view of the pedal insufflation unit.

FIG. 4 shows the bellows pedal (6) and the pedal connection (6a) joining it to the pedal tube (5) that conducts air to the perpendicular section (3c) to be distributed to the rest of the device.

Figure 5:
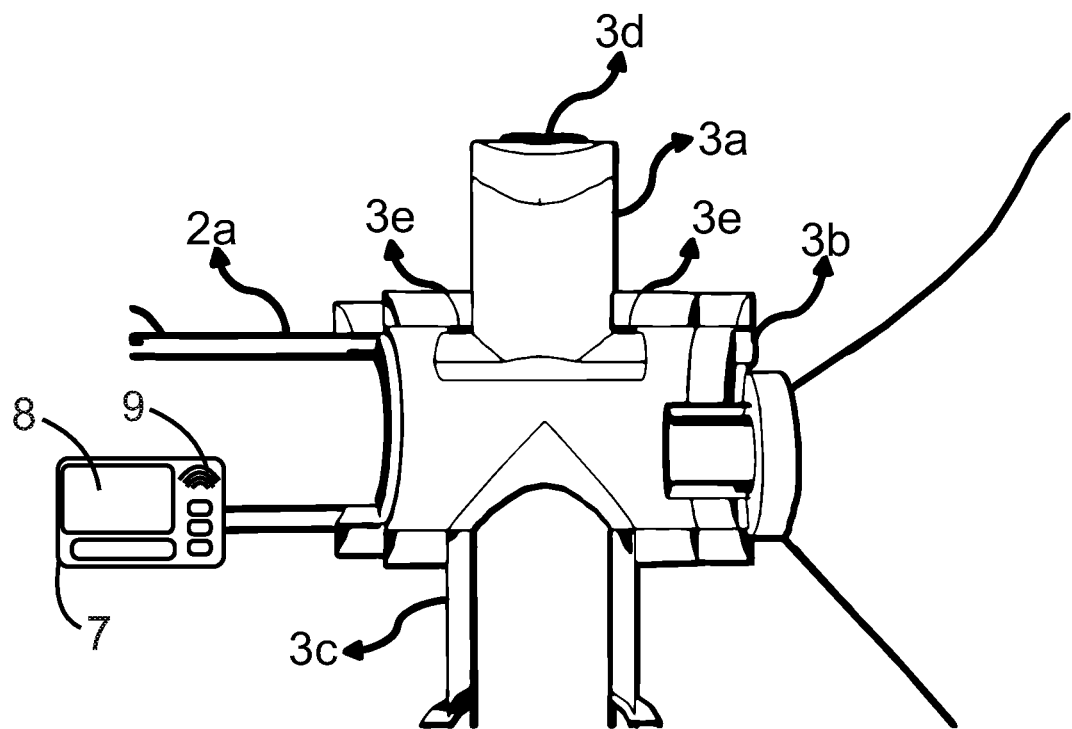
FIG. 5 shows a side view of the valve mechanism (3) and the closed state of the valve controlling the ambient air intake.
Figure 6:
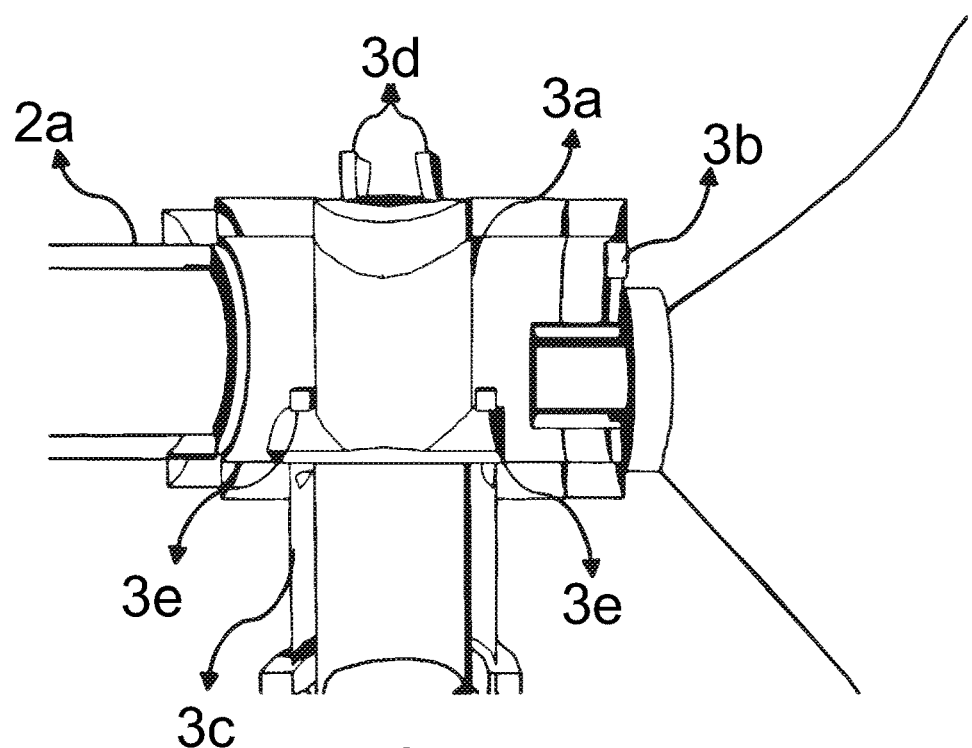
FIG. 6 shows a side view of valve mechanism (3) and the open state of the valve controlling the ambient air intake.
Figure 7:
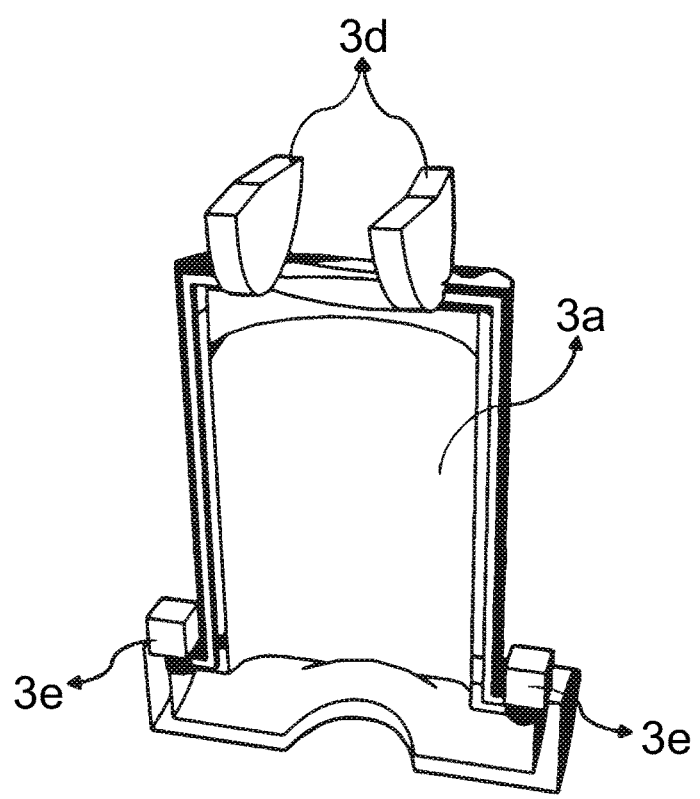
FIG. 7 shows a graphical illustration of the hollow damper (3a) and the relationship of the actuators to the valve (3d).

The hollow damper (3a) is hollow inside and has a valve (3d) which controls the entry of ambient air through the perpendicular section (3c) to be carried through the pedal tube (5) and finally reach the bellows pedal (6). In this way, the bellows pedal (6) will have the necessary fluid to propel the oxygen from the reservoir back into the mask (1). The valve (3d) closes when the bellows pedal (6) is depressed, because the actuators (3e) which are connected to the valve (3d), are in turn depressed by the inner wall of the valve mechanism (3) as shown in FIG. 5, generating the closing of the valve (3d) by a mechanical, hydraulic, pneumatic or electronic closing mechanism as shown in FIG. 7. In FIG. 6 the actuators (3e) are shown released, this occurs when the bellows pedal (6) is not depressed, therefore, when the actuators (3e) are released the valve (3d) opens and allows ambient air to enter through the perpendicular section (3c) and then the pedal tube (5) to finally reach the bellows pedal (6). The valve (3d) has a conventional and commercially available impurity filter that prevents the entry of unwanted particles.

In one embodiment of the invention, the device has a frequency meter (7) with LED display (8) for visualization of the frequency signals and a signal transmitter (9) that transmits the data to an external display and allows estimating the frequency and ventilatory response of the patient to facilitate the decrease of respiratory acidosis without generating barotrauma, by measuring exhaled CO2 continuously; which in turn serves to measure the respiratory frequency and the measurement of oxygen saturation SP02, which is also useful in the estimation of heart rate.

When the patient is on the floor and the bellows pedal (6) cannot be actuated due to the position of the healthcare personnel, a compressor (10) is actuated which accumulates air and subsequently releases this air towards the patient in a synchronous manner, i.e. the insufflation is automated based on the measurement of the different sensors.

Airway Mask Bag Unit (AMBU) ventilation must maintain adequate systemic oxygenation in order to maintain basal body requirements and hemodynamic stability. Therefore, the new invention of a foot-operated insufflation unit for airway mask provides a ventilation solution that allows the operator to acquire a favorable position to perform the mask seal (1) and balloon insufflation, in order to achieve effective ventilations, reducing the resistance to the entry and exit of fresh gases and reducing both the excessive loss of air in the system and the physical effort made by the health professional in charge, by improving the ergonomics to carry out the maneuver.

The invention claimed is:

1. A foot-operated insufflation unit for an airway mask, comprising:
    a valve mechanism (3) having a section (3c) configured to be coupled to a pedal tube (5), a reservoir coupling (4a) configured to couple a reservoir (4) to said valve mechanism (3), and a hollow damper (3a) including a valve (3d), wherein a stream of air flowing from said pedal tube (5) into said valve mechanism (3) causes said hollow damper (3a) to move allowing passage of an air mixture of said stream of air and oxygen from the reservoir (4) into an airway mask (1) while said valve (3d) blocks entry of ambient air into said pedal tube (5); and an absence of the stream of air flowing from said pedal tube (5) causes said hollow damper (3a) to remain static blocking passage of said air mixture into the airway mask (1) while said valve (3d) allows passage of said ambient air into the pedal tube (5).

2. The foot-operated insufflation unit according to claim 1, wherein said valve mechanism (3) further comprises a reservoir damper (3b) configured to couple an external source of oxygen to said valve mechanism (3).

3. The foot-operated insufflation unit according to claim 2, wherein oxygen from said external source is stored on said reservoir (4).

4. The foot-operated insufflation unit according to claim 2, wherein said air mixture of the stream of air and oxygen from reservoir (4) further includes the oxygen from said external source.

5. The foot-operated insufflation unit according to claim 1, further comprising at least one actuator (3e) connected to said valve (3d), and being configured to open or close said valve (3d).

6. The foot-operated insufflation unit according to claim 5, wherein said at least one actuator (3e) closes the valve (3d) when said at least one actuator (3e) is actuated by an inner wall of said valve mechanism (3).

7. The foot-operated insufflation unit according to claim 5, wherein said at least one actuator (3e) opens the valve (3d) when said at least one actuator (3e) is not actuated by an inner wall of said valve mechanism (3).

8. The foot-operated insufflation unit according to claim 5, wherein said at least one actuator (3e) is connected to said valve (3d) through a mechanical, hydraulic, pneumatic or electronic closing mechanism.

9. The foot-operated insufflation unit according to claim 1, wherein said hollow damper (3a) further includes an opening opposite to said valve (3d), said opening allowing the passage of said ambient air from said valve (3d) into the pedal tube (5).

10. The foot-operated insufflation unit according to claim 1, further comprising a bellows pedal (6) connected to said pedal tube (5), wherein the stream of air flowing from the pedal tube (5) is provided by said bellows pedal (6) when pressed.

11. The foot-operated insufflation unit according to claim 10, wherein said ambient air is directed into said bellows pedal (6) when depressed.

12. The foot-operated insufflation unit according to claim 1, wherein the stream of air flowing from said pedal tube (5) is provided by a compressor (10) connected to said pedal tube (5).

13. The foot-operated insufflation unit according to claim 1, wherein said valve (3d) comprises a filter configured to filter unwanted particles from said ambient air.

14. The foot-operated insufflation unit according to claim 1, wherein said airway mask (1) comprises a perimeter hermetic seal (la) configured to be placed over a face of a patient.

15. The foot-operated insufflation unit according to claim 1, further comprising a pressure measuring device (2c) configured to indicate a pressure at which the air mixture is being insufflated.

16. The foot-operated insufflation unit according to claim 15, wherein said pressure measuring device (2c) is coupled to a coupling (2) that connects the airway mask (1) with the valve mechanism (3).

17. The foot-operated insufflation unit according to claim 16, wherein said measuring device (2c) is coupled to said coupling (2) through a perpendicular connector (2b).

18. The foot-operated insufflation unit according to claim 1, further comprising a coupling (2) connecting the airway mask (1) with the valve mechanism (3).

19. The foot-operated insufflation unit according to claim 1, further comprising a frequency meter (7) configured to estimate a frequency and ventilatory response of a patient by measuring exhaled CO2.

20. The foot-operated insufflation unit according to claim 19, wherein said frequency meter (7) further comprises a LED display (8) configured to visualize a frequency signal and a signal transmitter (9) configured to transmit data to an external display.

* * * * *